United States Patent
Beesley et al.

(10) Patent No.: US 10,983,335 B2
(45) Date of Patent: Apr. 20, 2021

(54) SELF CLEANING PHOTO EYE APPARATUS AND METHOD

(71) Applicant: ILLINOIS TOOL WORKS INC., Glenview, IL (US)

(72) Inventors: Robert C. Beesley, Greenville, SC (US); J. Mark Nunn, Simpsonville, SC (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 198 days.

(21) Appl. No.: 16/105,438

(22) Filed: Aug. 20, 2018

(65) Prior Publication Data
US 2019/0187462 A1 Jun. 20, 2019

Related U.S. Application Data

(60) Provisional application No. 62/599,879, filed on Dec. 18, 2017.

(51) Int. Cl.
*G02B 27/00* (2006.01)
*B08B 5/02* (2006.01)

(52) U.S. Cl.
CPC ............ *G02B 27/0006* (2013.01); *B08B 5/02* (2013.01)

(58) Field of Classification Search
CPC .. B60S 1/56; B60S 1/54; B60S 1/0848; B60S 1/52; G02B 27/0006; H04N 5/2171; B08B 5/02; B08B 3/02; B60R 11/04
See application file for complete search history.

(56) References Cited

U.S. PATENT DOCUMENTS

| | | | | |
|---|---|---|---|---|
| 4,561,732 A * | 12/1985 | Japes | ............... | B60R 1/0602 359/509 |
| 5,812,314 A * | 9/1998 | Kuriaki | ............... | B23K 1/0056 359/507 |
| 6,290,361 B1 * | 9/2001 | Berzin | ............... | B60R 1/0602 15/250.003 |
| 8,282,377 B2 * | 10/2012 | Higashi | ............... | B29C 64/371 425/174.4 |
| 2002/0005440 A1 * | 1/2002 | Holt | ............... | B60S 1/54 239/284.2 |
| 2003/0155001 A1 * | 8/2003 | Hoetzer | ............... | B60S 1/0848 134/37 |
| 2003/0197909 A1 * | 10/2003 | Beyer | ............... | B23K 26/1494 359/509 |
| 2004/0200027 A1 * | 10/2004 | Sugihara | ............... | G03B 17/56 15/301 |

(Continued)

OTHER PUBLICATIONS http://machinedesign.com/print/pneumatics/basics-pneumatic-control-values, Parker Hannifin Corporation, "machine design," Aug. 8, 2002, Richland, Michigan, retrieved Apr. 6, 2016 (2 pages).

*Primary Examiner* — Christopher Stanford
(74) *Attorney, Agent, or Firm* — Pauley Erickson & Swanson

(57) ABSTRACT

An apparatus for self cleaning of a photo eye sensor in a machine includes at least one air nozzle disposed in air discharge communication with a surface to be cleaned of the photo eye sensor. The air nozzle is in air flow communication with air exhaust from an air cylinder of a component of the machine. Related, corresponding, or associated methods for self cleaning a photo eye sensor in a machine are also disclosed.

3 Claims, 3 Drawing Sheets

(56) References Cited

U.S. PATENT DOCUMENTS

| | | | |
|---|---|---|---|
| 2005/0206511 A1* | 9/2005 | Heenan | G06T 7/254 340/438 |
| 2007/0084763 A1* | 4/2007 | Stephenson | B07C 5/126 209/577 |
| 2007/0261711 A1* | 11/2007 | Fagrenius | G02B 27/0006 134/6 |
| 2009/0231707 A1* | 9/2009 | Ehm | B82Y 10/00 359/509 |
| 2011/0073142 A1* | 3/2011 | Hattori | B60S 1/56 134/56 R |
| 2011/0266375 A1* | 11/2011 | Ono | B60S 1/54 239/589 |
| 2012/0117745 A1* | 5/2012 | Hattori | B60S 1/54 15/250.01 |
| 2012/0243093 A1* | 9/2012 | Tonar | G03B 17/08 359/507 |
| 2013/0219742 A1* | 8/2013 | Field | G02B 27/0006 34/491 |
| 2013/0258472 A1* | 10/2013 | Ritzl | B23K 31/125 359/507 |
| 2014/0104426 A1* | 4/2014 | Boegel | B60R 1/06 348/148 |
| 2015/0151722 A1* | 6/2015 | Gokan | B60S 1/0848 134/102.2 |
| 2015/0183406 A1* | 7/2015 | Tanaka | B60R 1/00 134/99.1 |
| 2015/0277111 A1* | 10/2015 | Bell | G03B 17/12 359/509 |
| 2015/0296108 A1* | 10/2015 | Hayakawa | H04N 5/2251 348/148 |
| 2015/0353024 A1* | 12/2015 | Cooper | B60S 1/0848 348/148 |
| 2016/0272164 A1* | 9/2016 | Hsiao | B08B 3/02 |
| 2016/0325715 A1* | 11/2016 | Niemczyk | B60S 1/48 |
| 2018/0251100 A1* | 9/2018 | Mitsunari | B60S 1/56 |

* cited by examiner

SELF CLEANING PHOTO EYE APPARATUS AND METHOD

CROSS REFERENCE TO RELATED APPLICATION

This application claims the benefit of U.S. Provisional Application, Ser. No. 62/529,879, filed on 18 Dec. 2017. This U.S. Provisional Application is hereby incorporated by reference herein in its entirety and are made a part hereof, including but not limited to those portions which specifically appear hereinafter.

BACKGROUND OF THE INVENTION

Field of the Invention

This invention relates generally to photo eye sensors such as commonly used in or with manufacture, process and product conveyance systems and, more particularly, to an apparatus and method for self cleaning such photo eyes sensors and related devices.

Description of Prior Art

Photo eye sensors are commonly utilized in a wide variety of manufacture, process and product conveyance systems. For example, photo eyes are commonly employed in or with packaging equipment to sense product position and flow. Photo eye sensors are typically placed throughout or about packaging machines as required for desired monitoring of processing.

Unfortunately, product or package processing typically produces condensation, dust and particulate formation. Accumulation of such condensation, dust and particulate material on the lens of the photo eye sensor can degrade or otherwise act to reduce the ability of the sensor to function accurately and properly. Thus, it can be important that the lens of the photo eye be kept clean and free of particulate. This is also true for the reflective surface of an associated or corresponding reflector, if present.

Photo eye sensors can be located anywhere in or about a manufacture, process or product conveyance machine.

As will be appreciated, photo eye sensors may be strategically positioned or placed in locations that are generally not easily accessible for cleaning. That is, the placement, positioning or locating of the photo eye sensor may be such that cleaning of sensor by an operator may be difficult or at best, inconvenient. For example, a photo eye sensor may either or both be not be readily accessible or may require the discontinuation or stopping of operation to permit accessing.

Therefore, there exists a need for an apparatus and method for facilitating the desired cleaning of photo eye sensors and related devices, such as reflectors or reflective surfaces commonly used in conjunction with such sensors.

SUMMARY OF THE INVENTION

The present invention is directed to photo eye sensors such as commonly used in manufacture, process and product conveyance systems and, more particularly, to an apparatus and method for self cleaning such photo eyes sensors and related devices.

In accordance with one aspect of the subject development, there is provided an apparatus for self cleaning such photo eyes sensors in a machine operations environment.

In one preferred embodiment, such an apparatus includes at least one air nozzle disposed in air discharge communication with a surface to be cleaned of a photo eye sensor, with the at least one air nozzle in air flow communication with air exhaust from an air cylinder of a component of the machine.

An apparatus for photo eye sensor self cleaning in a machine in accordance with another preferred embodiment includes a plurality of air nozzles each in air discharge communication with a photo eye sensor surface to be cleaned. In such an apparatus, each of the plurality of air nozzles can desirably be in air flow communication with air exhaust from a single air cylinder of a component of the machine.

In accordance with another aspect of the subject development, methods for self cleaning a photo eye sensor in a machine are provided.

In one preferred embodiment, one such method involves conveying exhaust air from an air cylinder of a component of the machine to a photo eye sensor and then applying the exhaust air onto a surface of a photo eye sensor to remove debris from the surface.

As used herein, references to the removal of "debris" from a photo eye sensor surface are to be understood to refer to the removal of condensation, dust, particulate matter and the like from the referenced surface of the photo eye sensor.

Further, references to a photo eye sensor "surface" are to be understood as generally referring to an operational face or portion of the sensor assembly such as an eye sensor lens or associated reflector or reflective surface.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
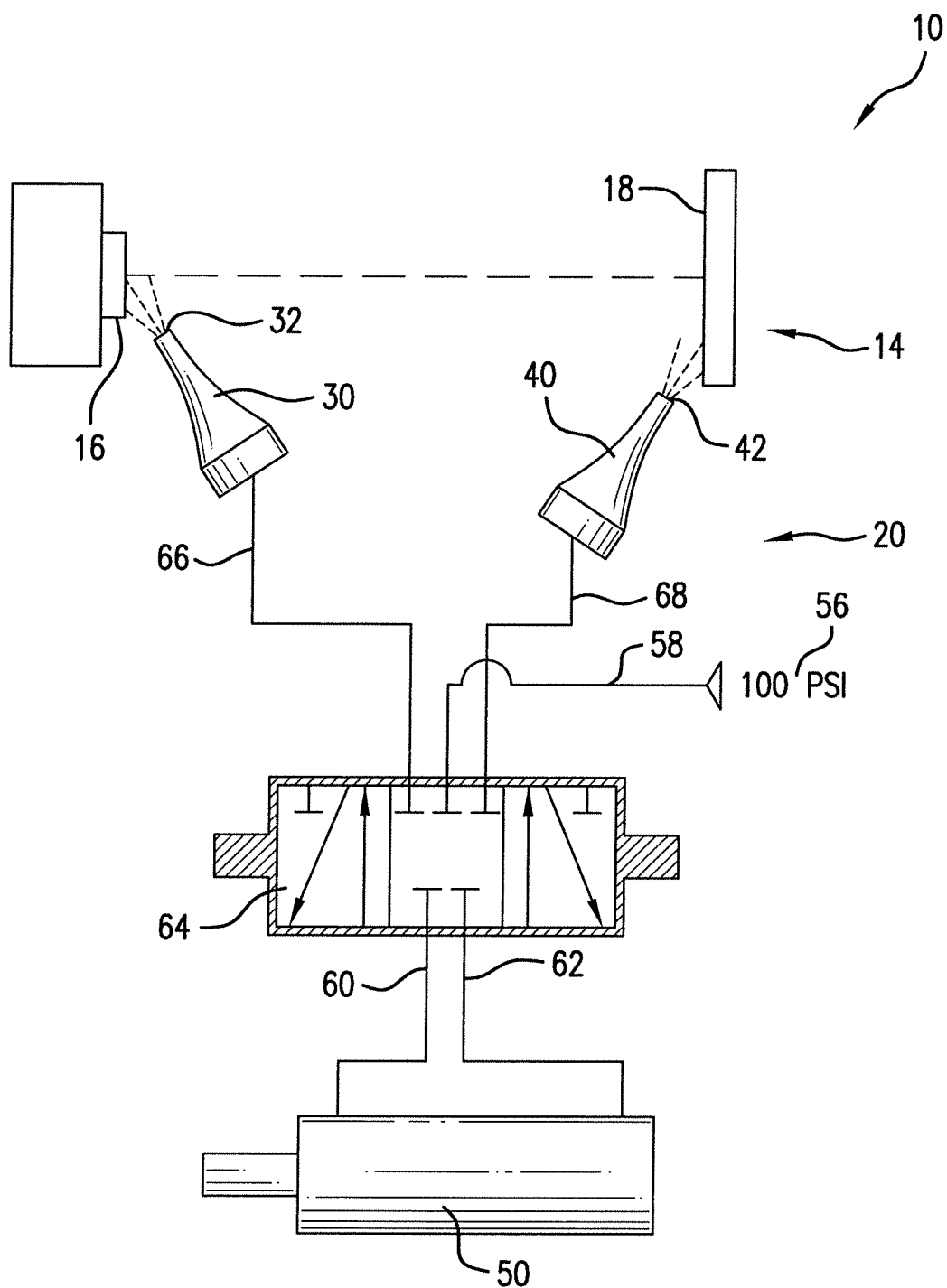
FIG. 1 is a simplified schematic of an apparatus according to one preferred embodiment of the invention.

FIG. 1 is a simplified schematic of an assembly, generally designated by the reference numeral 10. The assembly 10 includes a photo eye sensor arrangement 14 such as commonly employed in a variety of manufacture, process and product conveyance applications. The photo eye sensor arrangement 14 includes first and second photo eye sensor components 16 and 18 such as composed of a photo eye lens and an associated or corresponding reflector, for example.

As detailed further below, the assembly 10 also includes or incorporates an apparatus, according to one preferred embodiment of the invention and generally designated by the reference numeral 20, for the self cleaning of a photo eye sensor. The apparatus 20 includes a first air nozzle 30 having a discharge opening 32 directed to or at the first photo sensor component 16 and, more particularly, the active or functioning surface thereof, e.g., the photo eye lens. The apparatus 20 further includes a second air nozzle 40 having a discharge opening 42 directed to or at the second photo sensor component 18 and, more particularly, the active or functioning surface thereof, e.g., the reflecting surface of the reflector associated or corresponding to the photo eye lens.

The extent and duration of the discharge or application of the air from the nozzles in accordance with a preferred embodiment of the invention onto the active or functioning surface of the respective photo sensor component are desirably sufficient to dislodge, displace or otherwise effectively move debris that may have formed, collected or otherwise gathered onto the photo sensor component surface, such as during placement and operation of the photo eye sensor arrangement in a manufacture, process and product conveyance applications, for example. As a result of effective movement or removal of such debris, the operational functioning of the photo eye sensor arrangement can be significantly enhanced. Moreover, the incorporation and utilization of such an apparatus for the self cleaning of photo eye sensor components better permits or allows the placement or location of such photo eye sensor components in placements or locations not normally easily accessible for cleaning or in placements or locations inaccessible to an operator.

As shown, the air nozzles 30 and 40 are each appropriately joined or connected in air flow communication with an air source 50 such as an air cylinder of a component of the machine in or on which the photo eye sensor is located or disposed and such as commonly located and/or found in, by or with manufacture, process and product conveyance application environments. As will be appreciated by those skilled in the art and guided by the teaching herein provided, suitable such air source actuator cylinders can suitably be from any equipment or piece of equipment such as to permit the efficient use of exhaust air or what normally might be otherwise be deemed waste air in a useful and productive manner. For example, air source actuator cylinders find wide application and utilization in mechanical devices and related components which use the power of compressed gas to produce a force in a reciprocating motion.

To that end, a supply 56 of such exhaust air, such as from a component of the subject machine, is shown joined or connected in air flow communication with the air cylinder 50 such as via tubing or piping conduits 58, 60 and 62 and a solenoid valve 64.

As further shown, the air cylinder 50 is joined or connected in air flow communication with the air nozzles 30 and 32 via the tubing or piping conduits 60 and 62, the solenoid valve 64 and the tubing or piping conduits 66 and 68.

In accordance with a preferred embodiment, air exhausted from a component of the machine, particularly a component or operation at, near or adjacent the vicinity of or to the respective photo eye sensor arrangement, is utilized for this purpose.

Figure 2:
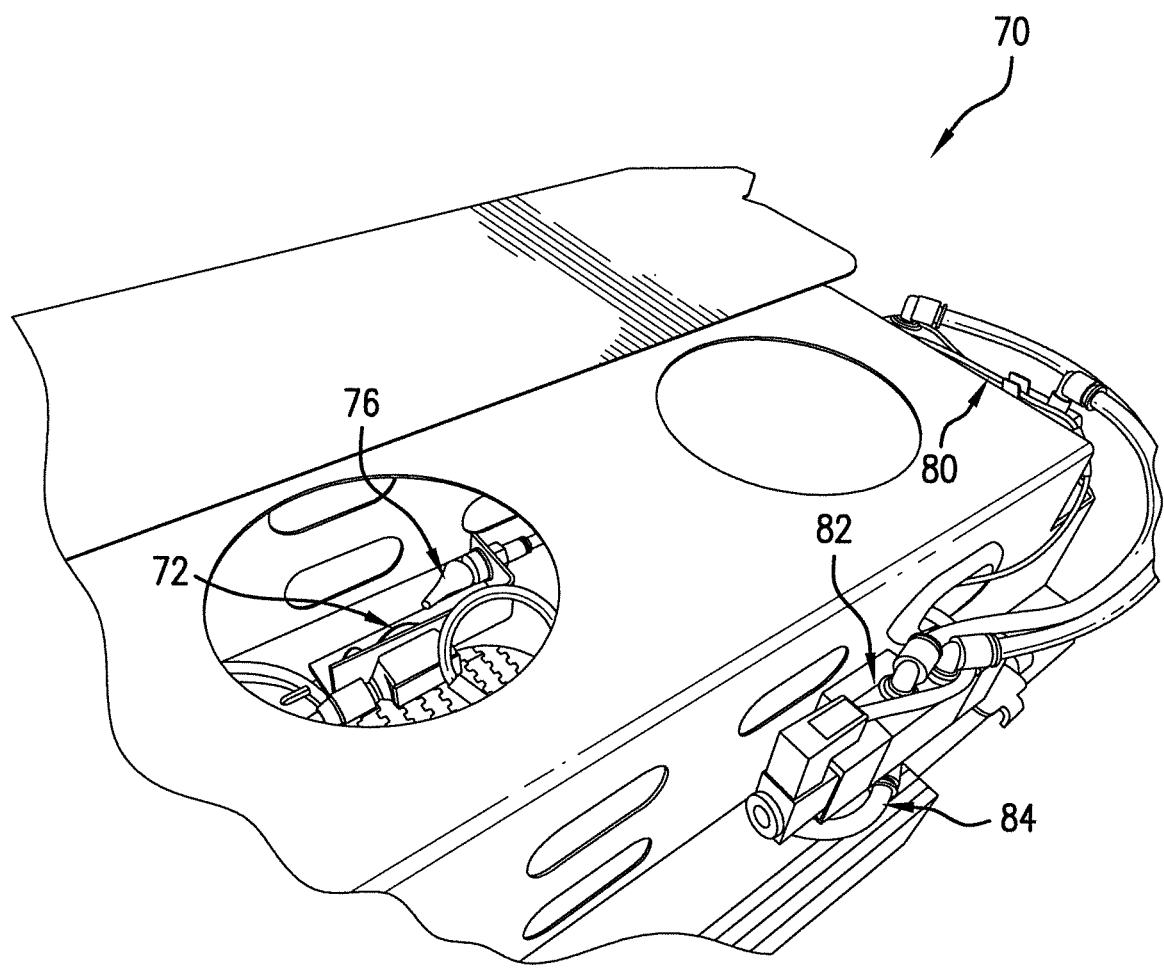
FIG. 2 is a side perspective view of a portion of a processing unit incorporating an apparatus according to one preferred embodiment of the invention.

To that end, FIG. 2 illustrates a portion of a processing unit 70 incorporating an apparatus for self cleaning of a photo eye sensor in accordance with one preferred embodiment of the invention.

A photo eye lens 72 is shown in an interior, not readily accessible, location in the processing unit 70. An air nozzle 76, such as herein described and provided in the subject invention, is shown in air discharge communication with the photo eye lens 72. An air cylinder 80 is joined or connected to a valve 82 to operate and connect in air flow communication the air cylinder 80 such that exhaust air is directed to the air nozzle 76, such as via the tubing 84.

Figure 3:
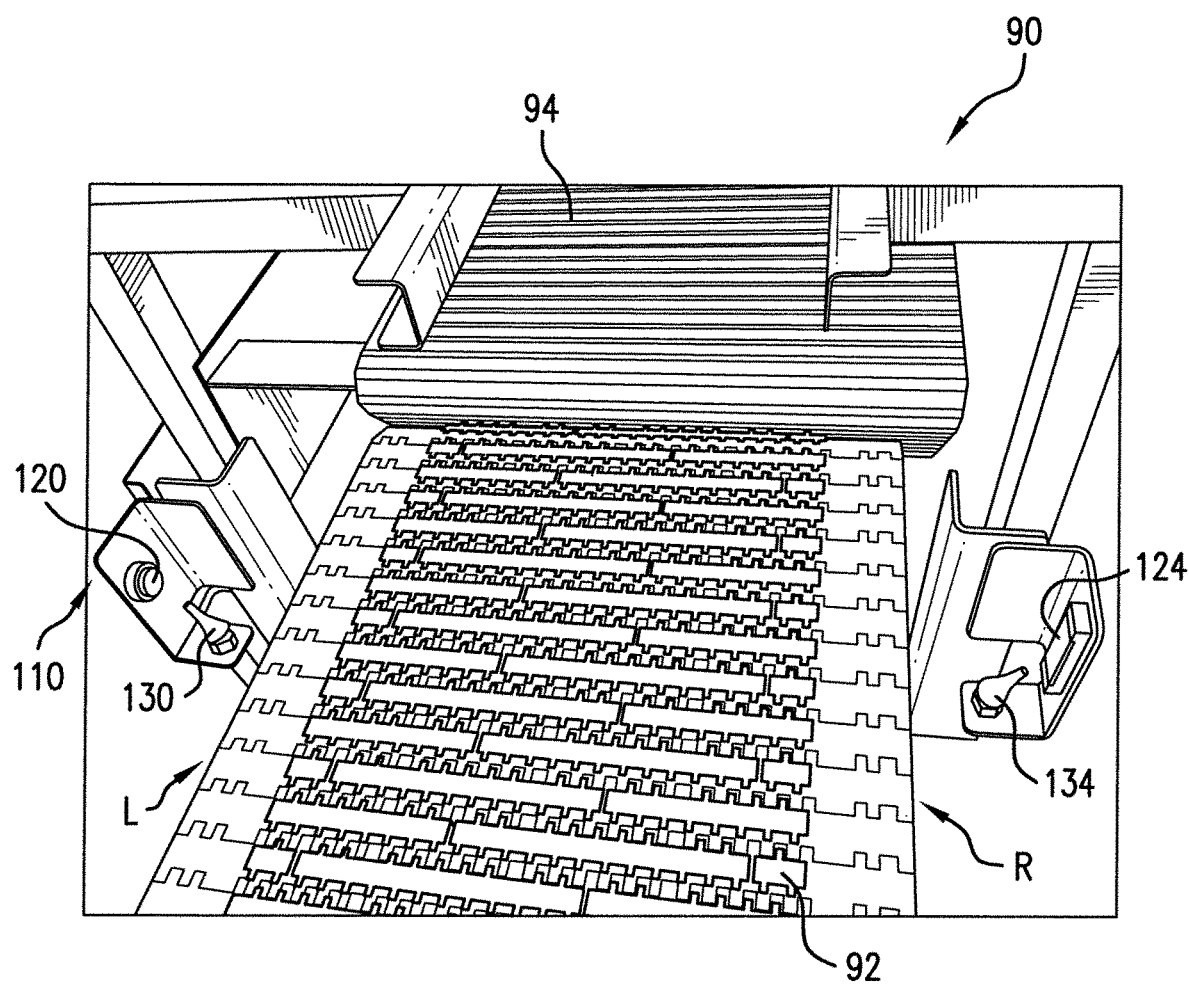
FIG. 3 is a perspective view of a portion of a processing unit incorporating an apparatus according to one preferred embodiment of the invention.

FIG. 3 is a perspective view of a portion of a processing unit 90 incorporating an apparatus for self cleaning of a photo eye sensor in accordance with one preferred embodiment of the invention.

The processing unit 90 includes a first and second conveyors 92 and 94, shown in end to end adjacent alignment. The processing unit 90 includes a photo eye sensor arrangement 110 such as positioned at or about the first conveyor 92, near the junction with the second conveyor 94 such as to permit monitoring of products or other objects being transported or conveyed therebetween, for example. The exemplary photo eye sensor arrangement 110 includes a photo eye lens 120 positioned on a first side L of the first conveyor 92 and a corresponding of associated reflector 124 positioned on the opposite side R of the first conveyor 92.

As shown, a first air nozzle 130 is positioned or placed so as to be in air discharge communication with the photo eye lens 120. Similarly, a second air nozzle 134 is positioned or placed so as to be in air discharge communication with the active or functioning surface of the reflector 124.

Though not specifically shown in FIG. 3, the air nozzles 130 and 134 are each appropriately joined or connected to a source of exhaust air from machine operations, such as described above.

As will be appreciated by those skilled in the art and guided by the teachings herein provided, in the practice of the subject development air discharge from a nozzle may, for example, be done continuously, periodically such as at selected time intervals, or on demand as may be desired for particular or specific applications.

Moreover, while some of the figures show air nozzles associated with both a photo eye lens component and a photo eye reflector, the broader practice of the invention is not necessarily so limited. For example, if desired, the invention can be practiced utilizing an air nozzle such as herein described in conjunction with only one of such components where such application might be more appropriate.

Furthermore, it is to be understood and appreciated that, two or more air nozzles such as herein described can, if desired, be directed to or at a single photo eye sensor component in a particular application. The utilization of such multiple air nozzles may be desired such as to provide air discharges from different angles or at different points in time, for example.

While the broader practice of the invention in not necessarily limited by or to use or practice in specific or particular manufacturing, processing or product conveying applications, in accordance with one aspect of the invention, the invention finds desirable application in packaging processing such as where the air exhaust employed in the subject apparatus results from or is produced by a component of a corresponding or associated packaging processing machine such as including, but not necessarily limited to, cartoners, decasers, fillers, palletizers, depalletizers, case packers, shrink wrappers and the like, for example.

While in the foregoing specification this invention has been described in relation to certain preferred embodiments thereof, and many details have been set forth for purpose of illustration, it will be apparent to those skilled in the art that the subject invention is susceptible to additional embodiments and that certain of the details described herein can be varied considerably without departing from the basic principles of the invention.

The invention claimed is:

1. A method for self cleaning a photo eye sensor in a packaging processing machine having an air source actuator cylinder powered by compressed air to move a component of the machine, the method comprising:
   generating a waste exhaust air from reciprocating the actuator cylinder during use of the component of the machine;

conveying the waste exhaust air from the actuator cylinder of the machine to at least one air nozzle disposed in air discharge communication with a surface to be cleaned of the photo eye sensor, and applying the waste exhaust air onto the surface to be cleaned of the photo eye sensor to remove debris from the surface.

2. The method of claim 1 wherein the waste exhaust air is conveyed from the actuator cylinder to the at least one air nozzle via one or more conduits and with a solenoid valve disposed in the air flow communication between the actuator cylinder and the at least one air nozzle.

3. The method of claim 1 wherein waste exhaust air from a single actuator cylinder of a component of the machine is conveyed to a plurality of said air nozzles.

* * * * *